United States Patent [19]

Poux et al.

[11] 3,738,420

[45] June 12, 1973

[54] APPARATUS AND METHOD FOR CONTROLLING TEMPERATURE IN A FEED SCREW

[75] Inventors: Robert J. Poux; Peter R. Deutsch, both of Titusville, Pa.

[73] Assignee: Phillips Petroleum Company, Bartlesville, Okla.

[22] Filed: Feb. 10, 1971

[21] Appl. No.: 114,362

Related U.S. Application Data

[62] Division of Ser. No. 784,007, Dec. 16, 1968, Pat. No. 3,588,956.

[52] U.S. Cl. ................................. 165/1, 165/87
[51] Int. Cl. ............................................. F28f 5/06
[58] Field of Search ................. 165/1, 87, 142, 146

[56]     References Cited
        UNITED STATES PATENTS
3,007,198  11/1961  Colwell et al. ................... 165/87

*Primary Examiner*—Charles Sukalo
*Attorney*—Pendelton, Newman, William & Anderson

[57]            ABSTRACT

A feed screw for advancing a thermoplastic resin has an interior bore through which a cooling medium is adapted to be circulated by conduits entering from an open entrance end of the bore. Adjustable means inserted into the bore forms a desired bore segment through which the cooling medium is freely circulated, thereby providing a desired temperature gradient along the screw length.

3 Claims, 4 Drawing Figures

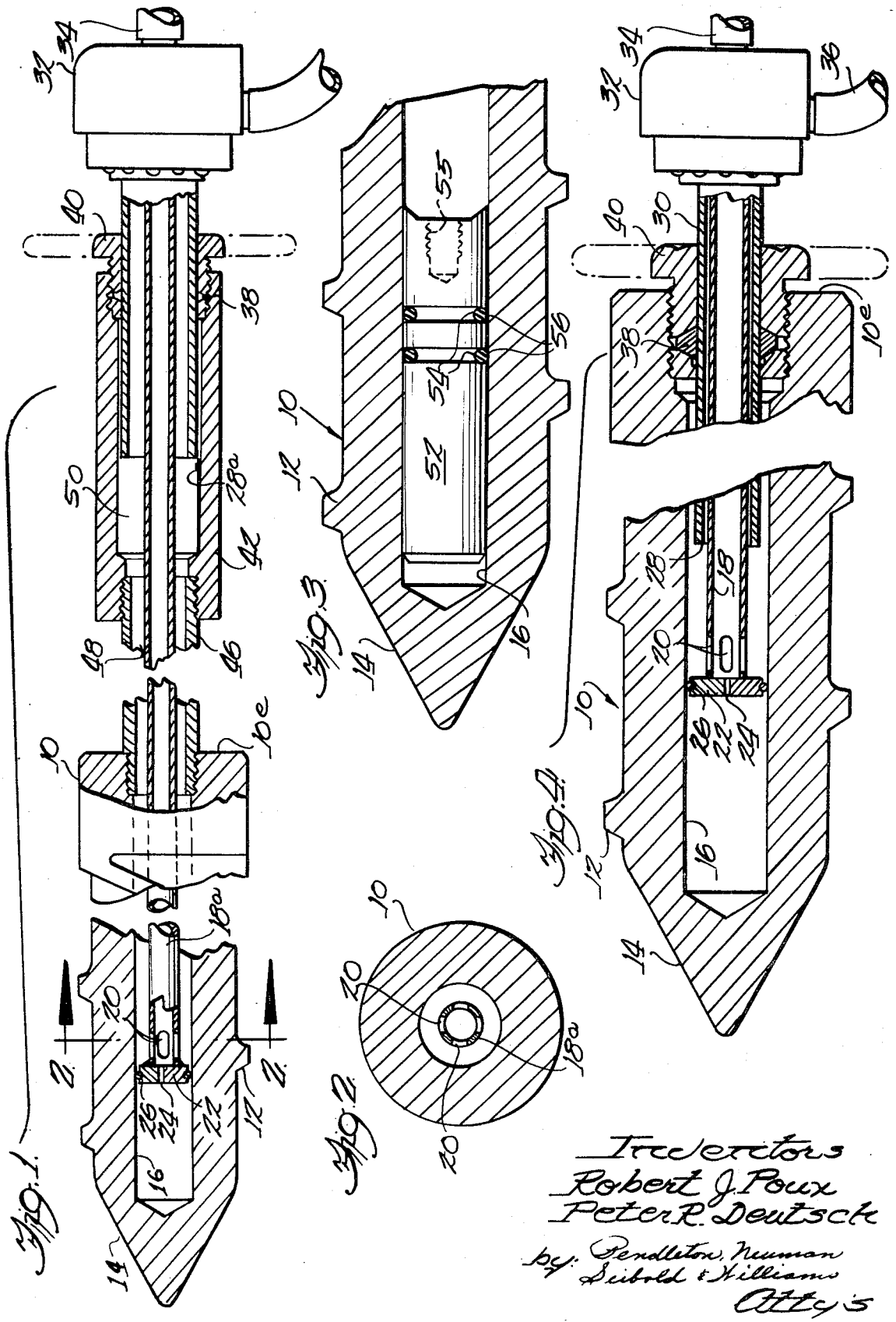

APPARATUS AND METHOD FOR CONTROLLING TEMPERATURE IN A FEED SCREW

This application is a division of our copending application Ser. No. 784,007 filed Dec. 16, 1968 and now U.S. Pat. No. 3,588,956 granted June 29, 1971.

BACKGROUND OF THE INVENTION

This invention relates to the art of forming plastic material, as by extrusion or the like, and more particularly pertains to an apparatus and method for controlling the temperature of a feed screw and the plastic material engaging the same.

In the formation of plastic materials the necessity of temperature control has long been recognized. The temperature and the resulting plasticity of a thermoplastic compound such as polyvinyl chloride is of critical importance in an extrusion or injection molding process. Formation of the thermoplastic compound requires close temerature control if both optimum product quality and optimum processing efficiency are to be assured.

The prior art efforts to provide temperature control of plastic materials have utilized channels for circulating temperature-control fluids adjacent the path of travel of plastic materials, as for example about an extrusion bore in which a rotatable feed screw is mounted. Also, a feed screw itself may be provided with an interior bore for circulation of a cooling fluid adapted to effect a desired temperature gradient along the screw length which in turn controls the temperature of the plastic materials engaged thereby, the resulting plasticity and the hydraulic pressure exerted on the plastic materials.

The prior art devices and methods for accomplishing temperature control of feed screws have been deficient in affording desired flexibility and adjustability in such control. Screws employing interior bores through which cooling media are circulated have employed regulators for effecting desired distribution of such media along the length of the screw interior bore. Such regulators have been disposed in fixed position in the bore adjacent the screw tip to obtain a desired tip temperature. Regulators have also been spaced at intervals along the bore length to obtain a temperature gradient along the entire screw length. The latter regulator arrangement employs one fixed setting and has no provision for adjustability in operation.

In accordance with this invention there are provided a method and apparatus for readily altering the volume of a feed screw interior bore through which temperature-control fluids are freely circulated so as to vary the temperature gradient along the screw to best suit the material fed in the particular process being carried out. Also, the apparatus elements employed in conjunction with the screw interior bore may define chambers in which either reduced circulation or no circulation of the fluids is permitted adjacent the screw tip or nose.

It is an object of this invention, therefore, to provide a feed screw for advancing plastic materials having an interior bore for reception of temperature-control fluids which is readily adjustable to provide varying temperature effects on the screw.

It is another object of this invention to provide novel adjustable plugs for defining desired segments of the screw interior bore adjacent the screw nose which no not receive temperature-control fluids, resulting in desired temperatures in such nose portion.

It is yet another object of this invention to provide a novel combination in which a baffle means is adjustably positionable in a screw interior bore whereby free and reduced circulation of temperature-control fluids are effected in desired bore segments.

It is a further object of this invention to provide a novel feed screw-cooling means combination in which the feed screw is rotatably mounted with rotatable conduit means projecting into an interior screw bore, the position of said screw relative to said conduit means being readily adjustable.

The above and other objects of this invention will become more apparent from the following detailed description when read in the light of the accompanying drawing and apended claims.

DESCRIPTION OF THE DRAWING

FIG. 1 is an enlarged fragmentary sectional view illustrating a screw made in accordance with this invention in combination with an extension cartridge;

FIG. 2 is a sectional view taken on line 2—2 of FIG. 1;

FIG. 3 is a sectional view, partly in elevation illustrating a plug embodiment of the subject invention; and FIG. 4 is a view similar to FIG. 1 illustrating a screw made in accordance with this invention.

DESCRIPTION OF THE INVENTION

Referring now to FIG. 4, a screw 10 is therein illustrated which is adapted to feed a thermoplastic compound such as polyvinyl chloride along the length of a cylindrical bore of an extruder, or the like, not illustrated. Suitably disposed about the periphery of the screw 10 is a thread 12. The forward end of the screw 10 terminates in a coincal tip or nose portion 14.

In the normal course of extrusion a thermoplastic material is worked and mixed by the thread disposed along the length of the main body portion of the screw. Upon reaching the nose 14 of the screw, however, it is essential that the thermoplastic material be in such a condition as to be readily extruded through a die into a desired shape. If the tip or nose portion 14 of the screw is not at a sufficiently elevated temperature, the extruded material will tend to "hang up" or layer, forming a pipe product or the like which is inconsistent in quality and subject to rapid deterioration. It has been found that by employing a screw nose portion which is at a more elevated temperature than the remainder of the screw body, little difficulty is experienced in the extrusion process. Difficulties of "hang up" and layering have been substantially completely avoided utilizing the screw constructions herein described, and extrusion rates have in some instances been greatly increased. Such temperature increase must be precisely localized to assure proper working and consistency of the plastic material prior to engaging the screw nose.

This invention is concerned with apparatus for assuring a desired temperature gradient along the length of a screw such as illustrated screw 10 so that the nose portion 14 is maintained at a desired temperature which differs from that in the remainder of the screw body. A desired temperature gradient is attained by means of interior screw bore 16 having a right-hand open entrance end and a left-hand end terminating in the nose portion of the screw as illustrated.

Centrally disposed in the bore 16 is an inlet tube 18 having a plurality of discharge ports 20, see FIG. 2, disposed in a distal portion thereof adjacent the nose portion of the screw. Connected to the end of the inlet tube 18 is a baffle member 22 having an aperture as at 24, through which a portion of the cooling or heating medium passing into the screw interior bore 16 may enter into the bore portion which is to the left of the baffle member. The baffle member aperture may merely be of a size to facilitate exhaustion of the atmosphere in the bore closed end portion in the course of adjustment within the bore, or it may be of adequate size to provide a desired circulation between opposed sides thereof. O-ring 26 provides an effective seal preventing fluid circulation between opposite sides of the baffle other than that permissible through aperture 24. The fluid discharged through the openings 20 formed in the inlet tube 18 may readily circulate.

The discharged fluid, whether it be gas or liquid, may readily pass from the screw by means of an annular exit passageway 28 formed between the outer periphery of the inlet tube 18 and the inner periphery of outlet tube 30. The inlet and outlet tubes 18 and 30 are rotatably mounted and have a common anchor in union 32. Conduit 34 connected to union 32 and a source of cooling or heating fluid communicates with inlet tube 18. Conduit 36 communicates with outlet tube 30 and a disposal or processing site. A gas or liquid may thus freely circulate through the union and screw in a desired manner with the assistance of suitable pump and valve elements not illustrated.

Escape of fluid from the annular interval between the inner periphery of the screw bore 16 and the outer periphery of the discharge tube 30 is prevented by packing 38 which is forced into a fluid-sealing position by means of packing nut 40. In the event that it is desired to alter the temperature of the nose portion 14 of the screw 10, the packing nut 40 is loosened, freeing the screw 10 from engagement with the discharge tube 30 both of which rotate as a unit with inlet tube 18 in the normal condition.

Following loosening of the packing nut, the inlet tube 18 and baffle 22 may be adjusted as desired along the length of the outer periphery of the outlet tube 30. Markings may be disposed on the outer periphery of tube 30 so as to visually apprise the workman as to the precise location of the baffle meber 22 within the bore 16 of the screw member 10. The baffle location will inform the workman as to the temperatures to be expected in the nose portion of the screw. After the screw 10 has been relocated relative to the baffle 22 disposed at the end of the inlet tube 18, the packing nut 40 is again tightened so that the screw 10, and tubes 18 and 30, may again rotate as a unit. Packing nut 40 may have an enlarged head portion, as indicated in dotted lines, to facilitate loosening and tightening thereof. The screw 10 is driven by a motive means not illustrated, and comprising no part of this invention.

It is apparent from the foregoing description that the mere steps of loosening and tightening the packing nut 40 allow ready adjustability between the baffle member 22 disposed within the interior bore 16 of the screw 10 and the nose portion 14 of the screw so that a desired temperature may be imparted to the screw nose in the normal course of operation. The latter adjustability provides another variable at the command of the workman to arrive at desired processing conditions, assuring the optimum in quality in the formed articles.

In the event it is desired to decrease the temperature of the nose portion of the screw 10 utilizing a circulating coolant, the relative position between the screw 10 and the inlet tube 18 will be rearranged so that the baffle member 22 is moved to the left within the interior bore 16. If, however, it is desired to increase the temperature of the nose portion 14 of the screw 10, the relative positions of the inlet tube and screw will be adjusted so that the baffle member 22 is moved to the right in the bore 16 reducing circulation of a cooling medium to the bore portion adjacent the screw nose.

The baffle member 22 may be detachably connected to the end portion of the inlet tube 18 as by means of a threaded connection or the like so that baffle members having apertures of different sizes may be readily interchanged, thereby enabling varying temperature effects to be provided to the left of the baffle member, as viewed in FIG. 1.

FIG. 1 is illustrative of a combination in which end portion 10e of the screw 10 extends from within the cylindrical bore of an extruder. An extension, such as cartridge 42 illustrated in FIG. 1, extends through a gear reduction means, not shown, enabling the packing nut to be positioned and engaged readily outside of the extruder bore. It is intended that by utilizing the construction of FIGS. 1 or 4, the repositioning of the baffle member 22 relative to the screw 10 may readily take place in the normal course of oeration with no down time and with no disassembly other than the loosening of the nut 40 and respositioning of the baffle 22 within bore 16.

Utilizing cartridge 42, a connector such as nipple 46 is necessary to join the cartridge and screw end 10e. The circulation of the temperature control medium will then proceed from the elongate inlet tube 18a through orifices 20, bore 16, annular passage 48 defined by the nipple 46 and tube 18a, cartridge bore 50 and annular passage 28a defined by the outer periphery of tube 18a and inner periphery of outlet tube 30. Packing nut 40 of FIG. 1 prevents escape of the fluid media from the annular interval between cartridge 42 and discharge tube 30 by compressing packing 38.

The foregoing descriptions with respect to FIGS. 1 and 4 have been specific to the use of a baffle member disposed at the terminal end of an inlet tube conducting fluid medium into the inner bore of a screw member. FIG. 3 illustrates a solid plug member 52 having two annular grooves 54 for reception of sealing O-rings 56. As illustrated in FIG. 3, the O-rings enable the plug to be inserted in a tight fluid-sealing engagement in the inner bore 16 of a screw member 10. The frictional resistance imparted by the O-rings 56 enables the plug 32 to be disposed in desired fixed position along the length of the inner bore 16 of the screw 10. Although atmosphere at the closed end of bore 16 may normally escape in the course of positioning the plug, slotted O-rings may assist this escape.

To facilitate precise positioning of the plug 52, an end portion thereof may be tapped as at 55 for reception of the threaded end of a positioning rod or the like, which is adapted to move the plug into desired position within the bore 16. Appropriate positioning of the plug 52 adjacent the nose portion 14 of the screw member 10 will enable a desired temperature to be imparted to the nose portion. Any fluid medium which is circulated into the interior bore portion of the screw to the right of the plug as by means of the inlet and outlet tube arrangements illustrated in FIGS. 1 and 2, will maintain the bore portion to the right of the plug at a desired controlled temperature dictated by the fluid. The lengths of the plugs exemplified by plug 52 may be varied and the plugs may be replaced or repositioned by means of a positioning rod not illustrated and having a threaded end, by removing the inlet and outlet tubes from the interior bore of the screw and repositioning or replacing the plug member. Experience has shown that by increasing the temperature of the nose portion of a screw member with a plug such as is illustrated in FIG. 3, the extrusion rate of polyvinyl chloride was in some instances increased approximately 100 percent. In addition, it was found that the quality of the extruded product was greatly improved.

It is seen, therefore, from the foregoing description that a method and apparatus have been disclosed which are particularly adapted to provide for rapid altering of a temperature gradient along the length of a feed screw such as the illustrated screw 10. The baffle members 22 may be apertured to provide for reduced circulation of a fluid temperature-control medium into the nose portion of the screw member and provide for free circulation of a fluid medium in the right-hand portion of the inner bore of the screw communicating with the open entrance end of the bore. The plug members discussed above such as plug 52 illustrated in FIG. 3, prevent circulation of the fluid medium into the nose portion of the screw and provide a desired temperature in such nose portion. The plug members are preferably composed of brass or other material having good heat conductive properties.

Whereas the foregoing description has been specific with respect to extrusion screws, it should be appreciated that the above-discussed invention is equally applicable to reciprocating screw members such as are employed in injection molding. It is also apparent that a fluid cooling or heating medium may be circulated into the nose portion of the screw so as to closely control the temperature of the nose portion relative to the remainder of the screw body.

The present invention has been discussed with emphasis on certain structural embodiments and process steps; however, it is appreciated that various changes may be made without departing from the intended spirit and scope of the present invention defined in the appended claims.

We claim:

1. The method of maintaining desired temperature gradients in a screw adapted to advance plastic material and having an interior bore through which a temperature-control fluid is adapted to circulate, said bore having an open entrance end and a terminating end disposed adjacent a tip of said screw, the method comprising the steps of positioning an adjustably positionable apertured baffle means in said bore relative to said open entrance end until a first desired bore length extending between said open entrance end and said baffle means and a second desired bore length extending between said baffle means and said terminating end are attained, circulating a temperature-control fluid through said first bore length at a first rate of circulation, a portion of said temperature-control fluid passing through the baffle means aperture whereby said portion of said circulating fluid circulates through said second bore length at a second rate of circulation which is less than that of said first rate of circulation, the circulating temperature-control fluid being in direct contact with interior screw wall portions defining said first and second bore lengths.

2. The method of claim 1 in which the rate of circulation of said temperature-control fluid in said first desired bore length is modified by repositioning said baffle means along the bore length of said screw.

3. The method of claim 1 in which the circulation of said temperature-control fluid in said second bore length is modified by changing the size of the aperture in said baffle means.

* * * * *